May 19, 1970
C. H. BURNSIDE
3,513,043
COMPOSITE SOLID PROPELLANTS CONTAINING A PERFLUOROETHYLENE
RESIN, METAL AND A FLUOROELASTOMER
Filed Nov. 4, 1958
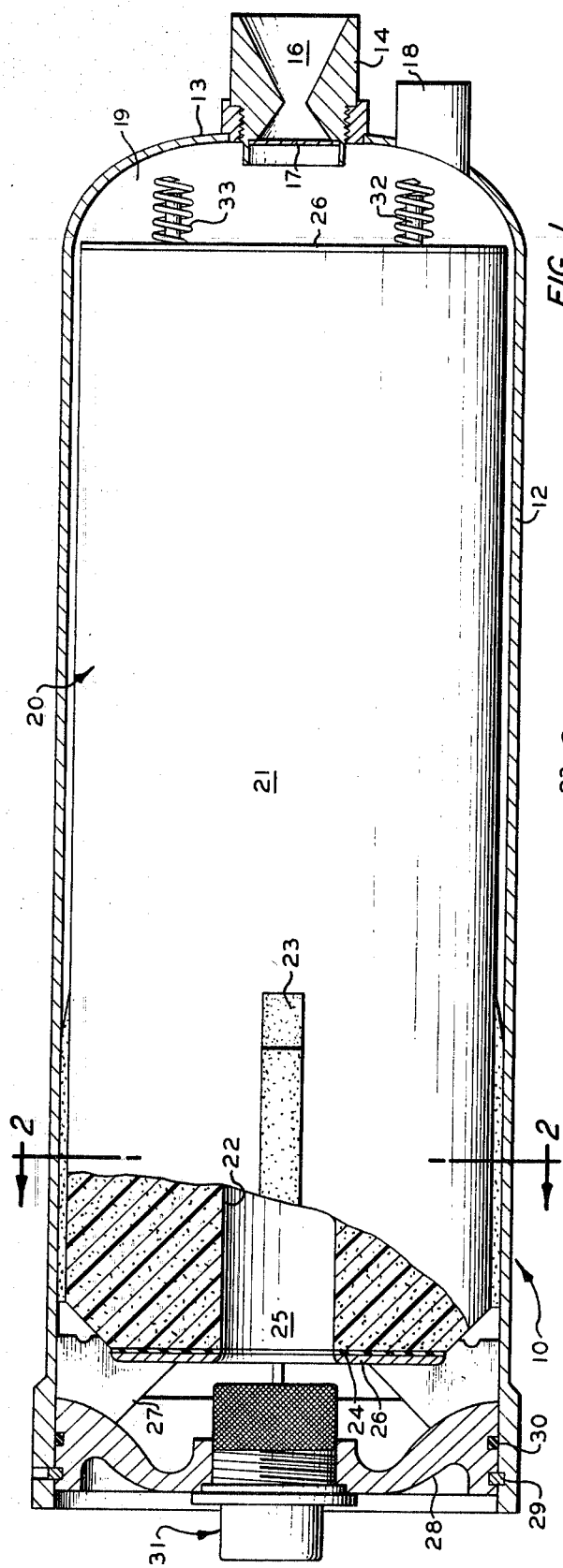
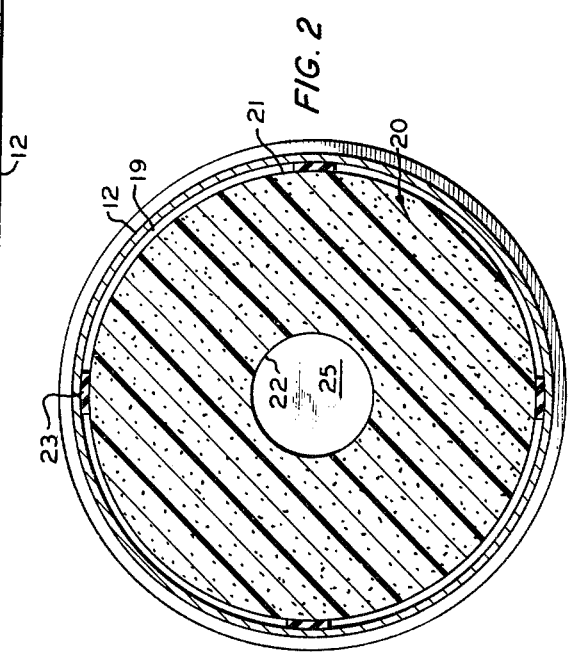
INVENTOR.
C.H. BURNSIDE
BY Hudson & Young
ATTORNEYS United States Patent Office 3,513,043
Patented May 19, 1970

3,513,043
COMPOSITE SOLID PROPELLANTS CONTAINING A PERFLUOROETHYLENE RESIN, METAL AND A FLUOROELASTOMER
Charles H. Burnside, Bartlesville, Okla., assignor to Phillips Petroleum Company, a corporation of Delaware
Filed Nov. 4, 1958, Ser. No. 771,925
Int. Cl. C06d 5/00
U.S. Cl. 149—19                    15 Claims This invention relates to solid propellant. In another aspect, it relates to high energy solid propellant, of the composite type, particularly useful in jet propulsion devices, such as missiles, rocket motors of the type employed to assist the takeoff of aircraft, gas generators, and the like. In another aspect, it relates to improved jet propulsion devices, such as rocket motors, loaded with novel, high energy solid propellant.

In the past 15 years or so, great interests developed in solid propellants for jet propulsion devices, such as missiles, rocket motors, gas generators, and the like. One type of solid propellant which has received particular attention is that of the composite type, a typical composite propellant being one that uses an organic resin as the fuel and binder and a solid oxidant, such as ammonium nitrate. Most of the prior art composite propellants exhibit relatively low specific impulse characteristics and are not competitive with high specific impulse liquid propellants units, while other prior art propellants have poor storage stability, and other unsatisfactory physical characteristics. While solid propellant rocket motors have a greater degree of reliability than liquid propellant rocket motors, the latter generally have higher specific impulses. Thus, there has arisen a need for a high energy solid propellant, that is, one having a specific impulse as great as or greater than that obtainable with current liquid propellant rocket motors.

Accordingly, an object of this invention is to provide a novel solid propellant. Another object is to provide a high energy solid propellant, particularly useful in jet propulsion devices, such as missiles, rocket motors employed to assist the takeoff of aircraft, gas generator, and the like. A further object is to provide an improved jet propulsion device, such as a rocket motor, loaded with a novel, high energy solid propellant. Another object is to provide a novel solid propellant having relatively high specific impulse, high density, and other satisfactory physical characteristics.

Further objects and advantages of this invention will become apparent to those skilled in the art from the following discussion, appended claims, and drawings in which:

FIG. 1 is a side elevational view in partial section of a rocket motor loaded with a solid propellant charge of this invention; and FIG. 2 is a cross-sectional view of FIG. 1 taken along the plane indicated.

The solid propellants of this invention comprise an inorganic oxidizing salt, such as ammonium perchlorate, a polyfluoroethylene resin, such as polytetrafluoroethylene, a fluoroelastomer, and powdered silicon, boron, or metal, such as aluminum. In addition, these propellants can comprise various compounding ingredients commonly employed in making composite propellants, such as oxidation inhibitors, reinforcing agents, wetting agents, modifiers, vulcanizing agents, curing agents, accelerators, burning rate catalysts, and like additives. The propellant composition can be formed into a grain having any desired shape or geometry, such as grains of the internal, external, and internal-external burning types. These grains can be molded, or extruded, and can be restricted with any suitable and well-known restricting material, such as rubber, and the whole cured according to known techniques.

A fuller understanding of this invention will be gained by reference ot the accompaniying drawing, in which there is illustrated a rocket motor 10, the particular jet propulsion device shown being that employed to assist the takeoff of aircraft, which device is known in the art as a JATO unit. The rocket motor 19 comprises a cylindrical casing 12 made of metal or the like, which has a reduced aft portion 13 having an axial opening into which a reaction nozzle 14 is threaded or otherwise secured. The nozzle is formed with internal restrictions so as to define a converging-diverging passage 16 of the De Laval type through which combustion gases pass. A blow-out diaphragm or starter disc 17, which is mounted across the passage 16, is designed so as to be ejected through the nozzle passage when the pressure in the rocket motor reaches a predetermined value, e.g., between 200 and 500 p.s.i. The reduced casing portion 13 is also provided with a safety plug attachment 18 which is adapted to rupture or otherwise function at a predetermined combustion chamber pressure so as to relieve excessive pressures which might otherwise rupture the rocket motor or cause an explosion. The cylindrical casing 12 defines a combustion chamber 19 in which is disposed a charge 20 of the novel solid propellant of this invention. The specific propellant charge illustrated is cylindrical in shape and has an outer diameter smaller than the inner diameter of the casing. The propellant charge 20 is an internal-external burning type by reason of its exposed or unrestricted outer cylindrical surface 21 and its inner exposed cylindrical surface 22 which is defined by an axial perforation 25 extending the length of the propellant. A plurality of resilient retaining pads 23, for example, strips of sponge rubber, are positioned between the head portion of the external burning surface and the adjacent head portion of the casing. The ends of the propellant are restricted by means of a layer of restricting material 24 which has a central opening in alignmetn with the axial perforation 25. Retaining plates 26 having similar openings cover the outside of the restricting material 24. Secured to the head retaining plate are outer-extending prongs or legs 27 which are adapted to register with and are held in place by head closure assembly 28 having retention means for igniter assembly 31. Head closure assembly 28 is held in position in the head end of casing 12 by means of key 29 which fits into appropriate grooves formed in the casing and head closure assembly 28. A sealing ring 30 is positioned in a groove cut into assembly 28 to prevent escape of combustion gases from the head end of the casing. The head end of the cylindrical casing is closed by means of head closure assembly 31 in combination with igniter assembly 28 which is retained in the opening provided in the axial portion of the assembly 28. It is noted that the igniter assembly 31 is provided with a removable cover which extends outwardly from this axial opening. The aft retaining plate has secured to its outer surface a plurality of prongs 32. The prongs are each surrounded by a compression string 33 adapted to come into contact with the reduced portion 13 of the casing. The aft retaining plate is thereby maintained firmly against the restricting material which covers the aft end of the solid propellant charge 20.

It is to be understood that rocket motor 10 is merely illustrative of a preferred type of jet propulsion device which can be loaded with a solid propellant charge fabricated in accordance with this invention. While the rocket motor illustrated is shown loaded with a single grain of solid propellant, it is to be understood that it can be loaded with a plurality of grains of solid propellant assembled in any desired fashion. Any suitable charge support means and igniter can be used other than that shown in the drawing for illustrative purposes.

In the operation of the rocket motor shown in the drawing, the motor is armed by removing the cover from the igniter assembly 31 and connecting suitable plugs thereof to an electrical circuit, not shown, which includes a source of power. Upon closing of a suitable switch, electric current fires squibs, matches, or the like, embedded in the ignition material within the igniter assembly 31, causing the ignition of the ignition material. The firing of the igniter 11 results in the formation of hot ignition products which are released from the igniter 31 and immediately propagate throughout the combustion chamber 19, heat from the ignition products being transferred to the exposed burning surfaces 21, 22 of the solid propellant charge 20, raising the surface thereof to an ignition temperature. The resulting ignition of the propellant charge 20 and its subsequent burning or consumption results in generating hot combustion gases which raise the pressure and temperature within the combustion chamber. When a predetermined starter disc bursting pressure is reached, for example, 200–500 p.s.i., the starter disc 17 functions, for example, by rupturing, and it is expelled from the rocket motor via the passage 16. The gases are then free to flow at a high velocity from the combustion chamber 19 through the constricted nozzle 16, thereby imparting thrust to the rocket motor.

As mentioned hereinbefore, the novel, high energy solid propellants of this invention comprise an inorganic oxidizing salt, a polyfluoroethylene resin, a fluoroelastomer, and powdered metal. Particularly useful inorganic oxidizing salts include the ammonium, alkali metal, and alkaline earth metal salts of nitric, perchloric, and chloric acids, and mixtures thereof. Representative inorganic oxidizing salts include sodium, potassium, magnesium, and ammonium perchlorates, lithium and strontium chlorates, and potassium, sodium calcium and ammonium nitrates.

A particularly useful polyfluoroethylene resin is polytetrafluoroethylene, $(C_2F_4)_n$, a commercially available product being sold as Teflon. These resins are highly fluorinated polymers and can contain fluorine in amounts less than polytetrafluoroethylene. Polytetrafluoroethylene can be manufactured by reacting calcium fluoride (Fluorspar) and sulfuric acid to give hydrogen fluoride which is in turn reacted with chloroform to give chlorodifluoromethane, which is converted by pyrolysis to gaseous tetrafluoroethylene monomer. Polymerization of the monomer is then effected at high temperatures and pressures. This polymer is a long straight chain of atoms packed closely together and can be used in the forms of powder and aqueous dispersion.

The fluoroelastomer useful in the propellants of this invention can be prepared by the copolymerization of vinylidene fluoride and hexafluoropropylene. The copolymerization of these monomers can be effected at temperatures up to 100° C. in an emulsion system utilizing a catalyst system comprising a mixture of a persulfate and a bisulfite, though other redox systems can be successfully used. Ammonium perfluorooctanoate can be employed as an emulsifying agent. The reaction between these two monomers is rapid and polymer can be separated from the latex by coagulation with ionic material such as sodium chloride or hydrofluoric acid. The vinylidene fluoride-hexafluoropropylene copolymer is amorphous and can have molecular weights as high as 150,000. A particularly useful commercially available polymer of this type is sold under the trademark "Viton A," and its composition can be represented by the following formula:

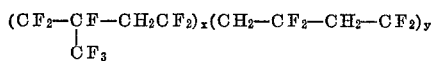

This copolymer has a Mooney viscosity of about 35–45, a Williams plasticity of 110, and a specific gravity of 1.85.

This copolymer contains about 65 percent fluorine by weight. In preparing this type of polymer, the hexafluoropropylene can be used in any desired amounts up to the theoretical maximum of 70 percent by weight. The vinylidene fluoride-hexafluoropropylene copolymer can be cross-linked by means of peroxides, high energy radiation, and some polyfunctional amines. Plasticizers which can be used to plasticize this copolymer include tricresyl phosphate, trioctyl phosphate, and dioctyl sebacate, these plasticizers preferably being used in quantities of less than 5 parts per 100 parts of the copolymer.

Useful powdered metals which can be incorporated in the propellant composition include those metals which form the more volatile fluorides, these metals having relatively low densities with molecular weights up to 30. Representative metals include aluminum, magnesium, beryllium, and the like. Alloys are also applicable, such as the aluminum alloys of boron, magnesium, manganese, zinc, copper, and the like. Silicon and boron can also be utilized.

Generally, the essential components of high energy solid propellant compositions of this invention are each present in minor amounts (i.e., less than 50 weight percent) and preferably will be present in the relative amounts set forth in Table I.

TABLE I

| Component: | Weight percent |
|---|---|
| Inorganic oxidizing salt | 30 to 45 |
| Polyfluoroethylene resin | 30 to 40 |
| Fluoroelastomer | 13 to 28 |
| Powdered metal, silicon and/or boron | 2 to 14 |

As mentioned hereinbefore, the polymer compositions can comprise various other compounding ingredients. Where it is desired to closely control the burning rate of the propellant, suitable burning rate catalysts can be incorporated in the polymer compositions. Representative burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other useful burning rate catalysts include copper chromite, ammonium dichromate, potassium dichromate, sodium dichromate, and the like.

The solid propellants of this invention have relatively high densities, generally in the range between 0.075 and 0.085, preferably in the narrower range of 0.080 to 0.082. As mentioned hereinbefore, these propellants have relatively high specific impulses, generally in the range between about 200 and 240 lb.-sec./lb. The burning rates of these propellants will vary over a wide range, and commonly will fall within the range of 0.15 to 1 in./sec. at 1000 p.s.i. These propellants have burning rates which are relatively insensitive to combustion chamber pressure, and will have burning rate exponents as low as 0.5 at 1000 p.s.i., and lower.

The propellant compositions of this invention are prepared by intimately mixing the various ingredients, e.g., by conventional solvent-mix or semisolvent mix techniques, the fluoroelastomer providing a matrix or continuous phase for the powdered or dispersed propellant components. For example, the vinylidene fluoride-hexafluoropropylene copolymer can be dissolved in a suitable solvent, such as acetone or nitroethane, to give a viscous liquid. The various powder ingredients, such as the inorganic oxidizing salt, the polytetrafluoroethylene resin, and powdered metal, silicon and/or boron, all of which materials can be powedered to a size in the range of from about 1 to 200 microns, are then added to the viscous liquid. The resulting composite mixture is stirred to a uniform state of dispersion, mixed under vacuum until the solvent is removed, and the resulting homogeneous mass consolidated in the form of a grain, for example, by extrusion, molding, or the like. Alternatively, the aforementioned powdered materials and the fluoroelastomer can all be added to a suitable solvent and mixed until a soft mass is formed. The solvent is then evaporated as before and the mass consolidated by extrusion, molding, or the like, into a grain of propellant. The grain of propellant can then be cured, for example, at temperatures in the range of about 180 to 260° F. for a sufficient length of time, e.g., 8-48 hours in a circulating air oven.

To further illustrate this invention, reference is made to the accompanying Table II which sets forth a number of propellant compositions prepared according to the practice of this invention. Strand specimens of some of these propellant compositions were prepared and burned, the measured ballistics data of these specimens being set forth in Table III. In these propellant compositions the polyfluoroethylene resin used was Teflon and the fluoroelastomer used was Viton A.

TABLE II.—PROPELLANT COMPOSITIONS

| Run | Components | Parts per 100 parts propellant | Weight, grams |
|---|---|---|---|
| A | Lithium perchlorate | 36.65 | 36.65 |
|   | Polyfluoroethylene resin | 30.6 | 30.6 |
|   | Fluoroelastomer | 27.25 | 27.25 |
|   | Boron | 5.5 | 5.5 |
| B | Lithium perchlorate | 35.65 | 35.65 |
|   | Polyfluoroethylene resin | 36.5 | 36.5 |
|   | Fluoroelastomer | 21.65 | 21.65 |
|   | Boron | 6.2 | 6.2 |
| C | Lithium perchlorate | 35.0 | 35.0 |
|   | Polyfluoroethylene resin | 40.5 | 40.5 |
|   | Fluoroelastomer | 18.0 | 18.0 |
|   | Boron | 6.5 | 6.5 |
| D | Lithium perchlorate | 32.2 | 311 |
|   | Polyfluoroethylene resin | 40.75 | 394 |
|   | Fluoroelastomer | 14.5 | 140.3 |
|   | Silicon | 12.56 | 121.3 |
|   | Ammonium dichromate | 1.0 | 9.66 |
| E | Lithium perchlorate | 32.2 | 64.4 |
|   | Polyfluoroethylene resin | 40.75 | 81.5 |
|   | Fluoroelastomer | 14.5 | 29 |
|   | Silicon | 12.56 | 25.16 |
|   | Ammonium dichromate | 1.5 | 3 |
| F | Lithium perchlorate | 32.2 | 48.3 |
|   | Polyfluoroethylene resin | 40.75 | 61.12 |
|   | Fluoroelastomer | 14.5 | 21.75 |
|   | Silicon | 12.65 | 18.84 |
|   | Ammonium dichromate | 2 | 3 |
| G | Lithium perchlorate | 32.2 | 260 |
|   | Polyfluoroethylene resin | 40.75 | 329 |
|   | Fluoroelastomer | 14.5 | 117 |
|   | Silicon | 8 | 64.5 |
|   | Aluminum | 6 | 48.4 |
|   | Ammonium dichromate | 2 | 16.1 |
| H | Lithium perchlorate | 32.2 | 322 |
|   | Polyfluoroethylene resin | 40.75 | 407.5 |
|   | Fluoroelastomer | 14.5 | 145 |
|   | Silicon | 8 | 80 |
|   | Aluminum | 6 | 60 |
|   | Ammonium dichromate | 2 | 20 |
|   | 2,2-dinitropropane | 0.5 | 5 |
| I | Lithium perchlorate | 32.2 | 322 |
|   | Polyfluoroethylene resin | 40.75 | 407.5 |
|   | Fluoroelastomer | 14.5 | 145 |
|   | Silicon | 8 | 80 |
|   | Aluminum | 6 | 60 |
|   | Ammonium dichromate | 2 | 20 |
|   | 2,2-dinitropropane | 0.1 | 1 |
| J | Lithium perchlorate | 34.5 | 345 |
|   | Polyfluoroethylene resin | 39.9 | 399 |
|   | Fluoroelastomer | 17.75 | 177.5 |
|   | Boron | 7.85 | 78.5 |
|   | Ammonium dichromate | 2 | 20 |
|   | 2,2-dinitropropane | 1 | 10 |
| K | Ammonium perchlorate | 41.6 | 41.6 |
|   | Polyfluoroethylene resin | 35.3 | 35.3 |
|   | Fluoroelastomer | 21 | 21 |
|   | Boron | 2.1 | 2.1 | should be understood that this invention is not to be unduly limited to that set forth herein for illustrative purposes.

I claim:

1. A solid propellant composition comprising about 30 to 45 weight percent of an inorganic oxidizing salt, about 30 to 40 weight percent of a polyfluoroethylene resin, about 13 to 28 weight percent of a fluoroelastomer prepared by the copolymerization of vinylidene fluoride and hexafluoropropylene and about 2 to 14 weight percent of a powdered material selected from the group consisting of silicon, boron, and a metal having a molecular weight up to 30.

2. A solid propellant composition according to claim 1 wherein said inorganic oxidizing salt is selected from the group consisting of the ammonium, alkali metal, and alkaline earth metal salt of nitric, chloric, and perchloric acids.

3. The solid propellant composition according to claim 2 wherein said polyfluoroethylene resin is polytetrafluoroethylene.

4. A solid propellant composition according to calim 2 wherein said powdered material is a metal which will form a volatile fluoride.

5. A solid propellant composition comprising 30 to 45 weight percent of an inorganic oxidizing agent selected from the group consisting of the ammonium, alkali metal, and alkaline earth metal salts of nitric, chloric, and perchloric acids, 30 to 40 weight percent of polytetrafluoroethylene resin, 13 to 28 weight percent of a copolymer of vinylidene fluoride and hexafluoropropylene, and 2 to 14 weight percent of a powdered material selected from the group consisting of silicon, boron and a metal having a molecular weight up to 30.

6. The solid propellant according to claim 5 wherein said inorganic oxidizing salt is lithium perchlorate.

7. The solid propellant according to claim 5 wherein said inorganic oxidizing salt is ammonium perchlorate.

8. The solid propellant according to claim 6 wherein said powdered material is boron.

9. The solid propellant according to claim 6 wherein said powdered material is aluminum.

10. The solid propellant according to claim 6 wherein said powdered material comprises aluminum and boron.

11. The solid propellant according to claim 6 wherein said powdered material comprises aluminum and silicon.

12. A solid propellant comprising 30 to 45 weight percent lithium perchlorate, 30 to 40 weight percent polytetrafluoroethylene, 13 to 28 weight percent of a copolymer of vinylidene fluoride and hexafluoropropylene, and 2 to 14 weight percent powdered boron.

13. A solid propellant comprising 30 to 45 weight percent lithium perchlorate, 30 to 40 weight percent polytetrafluoroethylene, 13 to 28 weight percent of a copolymer of vinylidene fluoride and hexafluoropropylene, and 2 to 14 weight percent powdered silicon.

14. A solid propellant comprising 30 to 45 weight percent lithium perchlorate, 30 to 40 weight percent polytetrafluoroethylene, 13 to 28 weight percent of a copolymer of vinylidene fluoride and hexafluoropropylene, and

TABLE III

| Ballistic measurement | Propellant composition | | | | | | | |
|---|---|---|---|---|---|---|---|---|
| | A | B | C | G | H | I | J | K |
| (1) Burning rate at 600 p.s.i. (in./sec.) | 0.425 | 0.417 | 0.205 | 0.395 | 0.283 | 0.203 | 0.278 | 0.512 |
| (2) Burning rate at 1,000 p.s.i. (in./sec.) | 0.766 | 0.795 | 0.400 | 0.552 | 0.405 | 0.259 | 0.482 | 0.760 |
| (3) Pressure exponent | 1.15 | 0.92 | 1.30 | 0.65 | 0.46 | 0.36 | 0.62 | 0.77 |
| (4) Pressure range (p.s.i.) of pressure exponent value | 300-1,600 | 1,000-1,600 | 300-1,600 | 300-1,600 | 300-815 | 300-900 | 300-540 | 300-1,600 |
| (5) Sensitivity of burning rate to temperature (70-170° F.), at 1,000 p.s.i. percent change/° F.) | 0.095 | 0.045 | 0.122 | 0.01 | 0.14 | | 0.15 | 1.82 |

Various modifications and alterations of this invention will become apparent to those skilled in the art from the foregoing discussion and accompanying drawing, and it 2 to 14 weight percent powdered aluminum.

15. A solid propellant comprising 30 to 45 weight percent lithium perchlorate, 30 to 40 weight percent polytetrafluoroethylene, 13 to 28 weight percent of a copolymer of vinylidene fluoride and hexafluoropropylene, and 2 to 14 weight percent powdered aluminum and silicon.

References Cited

UNITED STATES PATENTS

| | | |
|---|---|---|
| 2,622,277 | 12/1952 | Bonell et al. |
| 2,857,258 | 10/1958 | Thomas _____ 52—0.5 |
| 2,789,959 | 4/1957 | Smith _____ 260—95.5 |
| 2,866,721 | 12/1958 | Hetherington _____ 260—45.5 |
| 2,400,091 | 5/1946 | Alfthan _____ 260—45.5 |

OTHER REFERENCES

Chem. and Eng. News, Jan. 6, 1958, pp. 79–81.

Chem. and Eng. News, May 27, 1947, p. 22.

Noland: Chemical Engineering, vol 65, No. 10, May 19, 1958, p. 155.

Moore et al.: Jet Propulsion, November 1956, pp. 966–7.

Zaehringer: Solid Propellant Rockets, Second Stage, American Rocket Co., Box 1112, Wyandotte, Mich., September 1958, pp. 207–19.

BENJAMIN R. PADGETT, Primary Examiner